(12) United States Patent
Zhang et al.

(10) Patent No.: US 11,876,700 B2
(45) Date of Patent: Jan. 16, 2024

(54) NETWORK FAULT LOCATING METHOD AND APPARATUS

(71) Applicant: HUAWEI TECHNOLOGIES CO., LTD., Guangdong (CN)

(72) Inventors: Yabo Zhang, Beijing (CN); Xiangyu Kong, Shenzhen (CN); Yanmiao Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 17/394,618

(22) Filed: Aug. 5, 2021

(65) Prior Publication Data
US 2021/0367880 A1 Nov. 25, 2021

Related U.S. Application Data

(63) Continuation of application No. PCT/CN2020/076459, filed on Feb. 24, 2020.

(30) Foreign Application Priority Data

Feb. 22, 2019 (CN) .......................... 201910133987.7

(51) Int. Cl.
*H04L 12/703* (2013.01)
*H04L 45/28* (2022.01)
(Continued)

(52) U.S. Cl.
CPC .......... *H04L 45/28* (2013.01); *H04L 43/0829* (2013.01); *H04L 43/0852* (2013.01); *H04L 45/58* (2013.01)

(58) Field of Classification Search
CPC ..... H04L 45/741; H04L 45/72; H04L 45/304; H04L 2212/00; H04L 12/4633;
(Continued)

(56) References Cited

U.S. PATENT DOCUMENTS 7,590,128 B2 * 9/2009 Upp ....................... H04L 65/104
709/224
9,363,585 B2 * 6/2016 Carpini ............... H04J 14/0272
(Continued)

FOREIGN PATENT DOCUMENTS

| CN | 102368720 A | 3/2012 |
|---|---|---|
| CN | 102934395 A | 2/2013 |

(Continued)

OTHER PUBLICATIONS

Request for Comments: 4960, R. Stewart, Ed., Stream Control Transmission Protocol, Sep. 2007, total 152 pages.

*Primary Examiner* — Jung Liu
(74) *Attorney, Agent, or Firm* — HUAWEI TECHNOLOGIES CO., LTD.

(57) ABSTRACT

This application provides a network fault locating method and apparatus in an IP network. In this solution, a router automatically reports status information, and a controller determines, based on the status information, whether a communication path is faulty. If a fault exists, the controller may indicate a router on the communication path to perform fault locating. The fault locating can be completed without waiting for manual intervention, so that operation and maintenance efficiency in the IP network is improved. After completing the fault locating, the router reports location information of a fault point to the controller, and the controller may perform troubleshooting at the fault point, so that the fault can be quickly rectified.

17 Claims, 3 Drawing Sheets

(51) Int. Cl.
*H04L 43/0829* (2022.01)
*H04L 43/0852* (2022.01)
*H04L 45/58* (2022.01)

(58) Field of Classification Search
CPC . H04L 43/024; H04L 41/0677; H04L 41/342; H04L 41/34; H04L 41/40; H04L 69/22; H04L 45/50; H04L 12/4641; H04L 41/04; H04L 41/0631; H04L 43/04; H04L 43/20; H04L 12/56; H04L 43/0876; H04L 43/0829; H04L 43/0852; H04L 41/0686; H04L 2012/5625; H04L 43/10; H04L 43/0811; H04L 41/344; H04L 43/087; H04L 43/0817; H04W 72/0446

See application file for complete search history.

(56) References Cited

U.S. PATENT DOCUMENTS

| | | | |
|---|---|---|---|
| 2017/0111209 A1* | 4/2017 | Ward | H04L 12/4633 |
| 2018/0331890 A1* | 11/2018 | Song | H04L 41/08 |
| 2018/0331933 A1* | 11/2018 | Song | H04L 12/4633 |
| 2019/0268267 A1* | 8/2019 | Pignataro | H04L 45/741 |
| 2020/0112365 A1* | 4/2020 | Satbhaiya | H04J 14/0287 |

FOREIGN PATENT DOCUMENTS

| | | |
|---|---|---|
| CN | 103888295 A | 6/2014 |
| CN | 103905274 A | 7/2014 |
| CN | 104683187 A | 6/2015 |
| CN | 106559283 A | 4/2017 |
| CN | 107547252 A | 1/2018 |
| CN | 107809336 A | 3/2018 |
| WO | 2012070274 A1 | 5/2012 |

\* cited by examiner

NETWORK FAULT LOCATING METHOD AND APPARATUS

CROSS-REFERENCE TO RELATED APPLICATIONS

This application is a continuation of International Application No. PCT/CN2020/076459, filed on Feb. 24, 2020, which claims priority to Chinese Patent Application No. 201910133987.7, filed on Feb. 22, 2019. The disclosures of the aforementioned applications are hereby incorporated by reference in their entireties.

TECHNICAL FIELD

This application relates to the communications field, and in particular, to a network fault locating method and apparatus in the communications field.

BACKGROUND

A network is a channel for data transmission, and is also a basis for implementing communication. As an important network, the internet is more widely used in various fields. For example, as an intermediate network connecting a base station and a core network, a radio access network (RAN) also evolves according to the internet protocol (IP). A RAN to which an IP technology is applied is an IPRAN, and the IPRAN may also be referred to as an IP mobile backhaul (MBH) network.

IP is an important protocol on the internet, and is an upper-layer protocol of the Ethernet (ETH) protocol. The institute of electrical and electronics engineers (IEEE) 802.3 standard formulates a technical standard of the Ethernet protocol. The technical standard defines how information forms a data packet (packet). The Ethernet transmits a data packet through packet switching, and can multiplex a data link into a plurality of logical channels. Therefore, compared with a RAN to which a circuit switching-based technology such as a multi-service transfer platform (MSTP) is applied, the IPRAN has stronger flexibility and higher bandwidth utilization.

However, as a new technology, the IPRAN also has many problems. An operation, administration and maintenance (OAM) capability of the IPRAN is relatively weak. After receiving a complaint from a customer, an operator usually first notifies wireless network and core network engineers, and after determining that a wireless network and a core network normally run, the operator notifies IPRAN engineers. Subsequently, network communication can be restored only after the IPRAN engineers manually check and resolve a fault. These disadvantages lead to relatively difficult operation and maintenance of the IPRAN, and especially difficult operation and maintenance of an IPRAN connected to a large quantity of base stations in the 5th generation (5G) era.

SUMMARY

This application provides a network fault locating method and apparatus in an IP network. The apparatus collects status information of a communication path, and determines whether the communication path is faulty. When the communication path is faulty, a forwarding device on the communication path is indicated to perform fault locating, so that automatic network fault locating can be implemented.

According to a first aspect, this application provides a network fault locating method, including: receiving status information from a first router, where the status information is used to indicate a status of a communication path in an IP network; determining a fault of the communication path based on the status information; and sending indication information to a second router, where the indication information is used to indicate the second router to perform fault locating, and the second router is at least one router on the communication path.

The foregoing solution may be executed by a controller. In the foregoing solution, a router automatically reports status information, and the controller determines, based on the status information, whether a communication path is faulty. If a fault exists, the controller may indicate a router on the communication path to perform fault locating. The fault locating can be completed without waiting for manual intervention, so that operation and maintenance efficiency in the IP network is improved. After completing the fault locating, the router reports location information of a fault point to the controller, and the controller may perform automatic protection switching (APS) processing at the fault point, to transmit data through a protected path, so that the fault can be quickly rectified.

Optionally, the sending indication information to a second router includes: sending the indication information to the second router based on a type of the fault, where a correspondence exists between the type of the fault and a fault locating manner.

Different fault locating manners are used for different faults. For different types of faults, the controller indicates the router to use different processing manners, so that fault locating efficiency can be improved.

Optionally, the type of the fault is a packet loss, and the fault locating manner is adding in-band operation, administration and maintenance iOAM information to each IP packet.

In some packet loss scenarios, a packet loss rate is relatively low. If the router adds iOAM information to only some IP packets, a discarded IP packet may be an IP packet to which no iOAM information is added. Therefore, for a packet loss event, the controller indicates the router to add the iOAM information to each IP packet, so that fault locating accuracy can be improved.

Optionally, the second router is a router adjacent to a router on which a packet loss occurs, and the second router is a router on which no packet loss occurs.

The controller may determine, based on traffic statistics information, a communication path on which a packet loss occurs. The communication path on which the packet loss occurs may be a part of a relatively long communication path. In this case, the controller does not need to indicate routers on the entire communication path to perform fault locating, but needs to indicate only a normal router near the communication path on which the packet loss occurs to perform fault locating. In this way, fault locating efficiency can be improved, and information overheads for fault locating can be reduced.

Optionally, the type of the fault is a communication path interruption or a high forwarding latency, and the fault locating manner is adding iOAM information to one or more IP packets.

If the communication path is interrupted, a fault point can be located by using one or a few packets. Similarly, if the fault type is a relatively long forwarding time, a fault point can be located by determining a transmission rate of one or a few packets. For the foregoing type of fault, the controller does not need to indicate the second router to add the iOAM information to each IP packet, thereby reducing load and information overheads of the router during fault locating.

Optionally, the method further includes: sending configuration information to the first router, where the configuration information is used to configure reporting of the status information.

Some statuses of the IP network may not need to be monitored. In this case, the controller may indicate, by using the configuration information, the router to monitor a status that needs to be monitored, so that load of the router can be reduced.

According to a second aspect, this application provides another network fault locating method, including: receiving IP data; determining status information based on the IP data, where the status information is used to indicate a status of a communication path corresponding to the IP data; and sending the status information to a controller.

The foregoing solution may be executed by a first router. The first router determines a status of an IP network by monitoring the IP data forwarded by the first router, and sends the status information to the controller, so that the controller performs fault locating when a fault occurs in the IP network. Fault locating can be completed without waiting for manual intervention, thereby improving operation and maintenance efficiency in the IP network.

Optionally, the method further includes: receiving indication information from the controller; and performing fault locating according to the indication information.

Different fault locating manners are used for different faults. The first router uses different processing manners to locate a fault according to an indication of the controller, so that fault locating efficiency can be improved.

Optionally, the method further includes: receiving configuration information from the controller, where the configuration information is used to configure reporting of the status information.

Some statuses of the IP network may not need to be monitored, and the first router may monitor, based on the configuration information, a status that needs to be monitored, so that load of the first router can be reduced.

According to a third aspect, this application provides another network fault locating method, including: receiving indication information from a controller; and performing fault locating on a communication path in an IP network according to the indication information.

The foregoing solution may be executed by a second router, and the second router is a router located on the faulty communication path. The second router performs fault locating according to an indication of the controller, so that fault locating can be completed without waiting for manual intervention.

A first router determines a status of the IP network by monitoring IP data forwarded by the first router, and sends status information to the controller, so that the controller performs fault locating when a fault occurs in the IP network. In the foregoing solution, fault locating can be completed without waiting for manual intervention, thereby improving operation and maintenance efficiency in the IP network. After completing the fault locating, the second router reports location information of a fault point to the controller, and the controller may perform APS processing at the fault point, to transmit data through a protected path, so that the fault can be quickly rectified.

Optionally, before the receiving indication information from a controller, the method further includes: receiving IP data transmitted on the communication path; determining status information based on the IP data, where the status information is used to indicate a status of the communication path; and sending the status information to the controller.

The second router can determine a status of the IP network by monitoring the IP data forwarded by the second router, and send the status information to the controller, so that the controller performs fault locating when a fault occurs in the IP network. In the foregoing solution, fault locating can be completed without waiting for manual intervention, thereby improving operation and maintenance efficiency in the IP network.

Optionally, the method further includes: receiving configuration information from the controller, where the configuration information is used to configure reporting of the status information.

Some statuses of the IP network may not need to be monitored, and the second router may monitor, based on the configuration information, a status that needs to be monitored, so that load of the second router can be reduced.

According to a fourth aspect, this application provides a communications apparatus. The apparatus may be a controller, or may be a chip in the controller. The apparatus may include a processing unit and a transceiver unit. When the apparatus is the controller, the processing unit may be a processor, and the transceiver unit may be a transceiver. The controller may further include a storage unit, and the storage unit may be a memory. The storage unit is configured to store an instruction, and the processing unit executes the instruction stored in the storage unit, so that the controller performs the method according to the first aspect. When the apparatus is the chip in the controller, the processing unit may be a processing module, and the transceiver unit may be an input/output interface, a pin, a circuit, or the like. The processing unit executes the instruction stored in the storage unit, so that the controller performs the method according to the first aspect. The storage unit may be a storage unit (for example, a register or a cache) in the chip, or may be a storage unit (for example, a read-only memory or a random access memory) that is in the controller and that is located outside the chip.

According to a fifth aspect, this application provides another communications apparatus. The apparatus may be a first router, or may be a chip in the first router. The apparatus may include a processing unit and a transceiver unit. When the apparatus is the first router, the processing unit may be a processor, and the transceiver unit may be a transceiver. The first router may further include a storage unit, and the storage unit may be a memory. The storage unit is configured to store an instruction, and the processing unit executes the instruction stored in the storage unit, so that the first router performs the method according to the second aspect. When the apparatus is the chip in the first router, the processing unit may be a processing module, and the transceiver unit may be an input/output interface, a pin, a circuit, or the like. The processing unit executes the instruction stored in the storage unit, so that the first router performs the method according to the second aspect. The storage unit may be a storage unit (for example, a register or a cache) in the chip, or may be a storage unit (for example, a read-only memory or a random access memory) that is in the first router and that is located outside the chip.

According to a sixth aspect, this application provides another communications apparatus. The apparatus may be a second router, or may be a chip in the second router. The apparatus may include a processing unit and a transceiver unit. When the apparatus is the second router, the processing unit may be a processor, and the transceiver unit may be a transceiver. The second router may further include a storage unit, and the storage unit may be a memory. The storage unit is configured to store an instruction, and the processing unit executes the instruction stored in the storage unit, so that the second router performs the method according to the third aspect. When the apparatus is the chip in the second router, the processing unit may be a processing module, and the transceiver unit may be an input/output interface, a pin, a circuit, or the like. The processing unit executes the instruction stored in the storage unit, so that the second router performs the method according to the third aspect. The storage unit may be a storage unit (for example, a register or a cache) in the chip, or may be a storage unit (for example, a read-only memory or a random access memory) that is in the second router and that is located outside the chip.

According to a seventh aspect, this application provides a computer-readable storage medium. The computer-readable storage medium stores a computer program, and when the computer program is executed by a processor, the processor is enabled to perform the method according to the first aspect.

According to an eighth aspect, this application provides a computer-readable storage medium. The computer-readable storage medium stores a computer program, and when the computer program is executed by a processor, the processor is enabled to perform the method according to the second aspect.

According to a ninth aspect, this application provides a computer-readable storage medium. The computer-readable storage medium stores a computer program, and when the computer program is executed by a processor, the processor is enabled to perform the method according to the third aspect.

According to a tenth aspect, this application provides a computer program product. The computer program product includes computer program code, and when the computer program code is run by a processor, the processor is enabled to perform the method according to the first aspect.

According to an eleventh aspect, this application provides a computer program product. The computer program product includes computer program code, and when the computer program code is run by a processor, the processor is enabled to perform the method according to the second aspect.

According to a twelfth aspect, this application provides a computer program product. The computer program product includes computer program code, and when the computer program code is run by a processor, the processor is enabled to perform the method according to the third aspect.

DESCRIPTION OF EMBODIMENTS

The following describes technical solutions of this application with reference to accompanying drawings.

Figure 1:
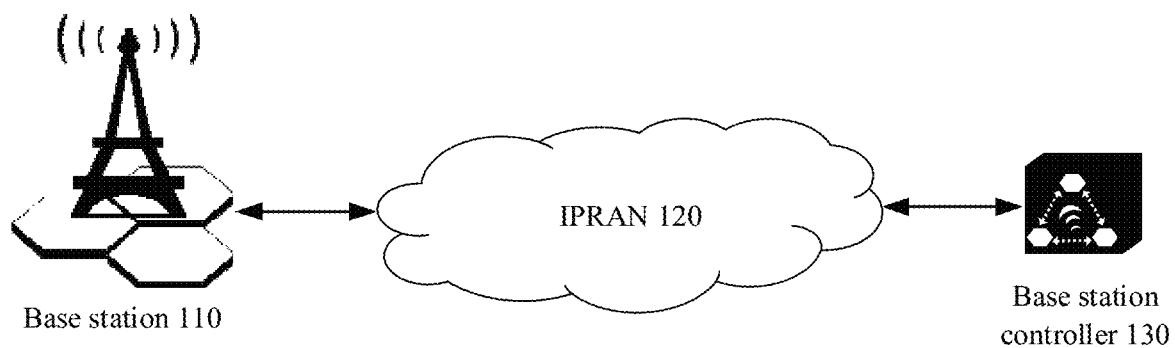
FIG. 1 is a schematic diagram of a communications system applicable to this application.

FIG. 1 is a schematic diagram of a communications system applicable to this application.

The communications system includes a base station 110, an IPRAN 120, and a base station controller 130.

The base station 110 may be a gNB (gNB) in a 5G communications system, an evolved NodeB (eNB) in a 4th generation (4G) communications system, a NodeB (node B) in a 3rd generation (3G) communications system, or a base transceiver station (BTS) in a 2nd generation (2G) communications system.

Corresponding to the base station 110, the base station controller 130 may be a network element that has a base station management function in the 5G communications system, for example, an access and mobility management function (AMF); or may be a network element that has a base station management function in the 4G communications system, for example, a mobility management entity (MME) or a serving gateway (SGW); or may be a radio network controller (RNC) in the 3G communications system or a base station controller (BSC) in the 2G communications system.

Information is transferred between the base station 110 and the base station controller 130 through the IPRAN 120. The IPRAN 120 may be a conventional Ethernet based on an IP technology, or may be a new Ethernet based on an IP technology, for example, a flexible Ethernet (FlexE). A specific type of the IPRAN 120 is not limited in this application.

The IPRAN 120 may include an optical fiber and a forwarding device. The optical fiber is configured to transmit an optical signal carrying information (or data), and the forwarding device is configured to forward the information to a next-hop node.

After a service flow (that is, a queue including a plurality of data packets) is sent from a switching board of the forwarding device, the service flow is usually successively processed by modules or components such as a traffic management (TM) module, a network processing unit (NPU), a medium access control (MAC)-layer module, and a physical-layer module (briefly referred to as "PHY" below).

The TM module performs quality of service (QoS) processing on the service flow based on available bandwidth of a network and a priority of the service flow. For example, if the available bandwidth of the network is insufficient to transmit all service flows, the TM module may transmit a high-priority service flow and discard a low-priority service flow.

The NPU is a chip that processes an Ethernet service and is configured to process an Ethernet frame. Ethernet frame processing includes Ethernet frame parsing and route searching.

The MAC-layer module is mainly responsible for connecting and controlling physical media at a physical layer. For a service packet in the Ethernet, physical layer information may be encapsulated and decapsulated at this layer.

The PHY may be defined as providing mechanical, electronic, functional, and normative characteristics for establishing, maintaining, and removing a physical link required for data transmission. The PHY mentioned in this specification may include physical-layer working components at a transmit end and a receive end, and an optical fiber between the transmit end and the receive end. The physical-layer working components may include, for example, a physical-layer interface device in the Ethernet.

Based on communication requirements, the IPRAN 120 may be further divided into different networks. For example, a part, of the IPRAN 120, close to the base station is an access layer, and a part, of the IPRAN 120, close to the base station controller is an aggregation layer. Correspondingly, forwarding devices at different locations have different functions.

For example, a forwarding device connected to the base station 110 is referred to as a cell site gateway (CSG), a forwarding device connected to the access layer and the aggregation layer is referred to as an aggregation site gateway (ASG), and a forwarding device connected to the aggregation layer and the base station controller 130 is referred to as a radio service gateway (RSG). The foregoing forwarding devices are, for example, routers.

Figure 2:
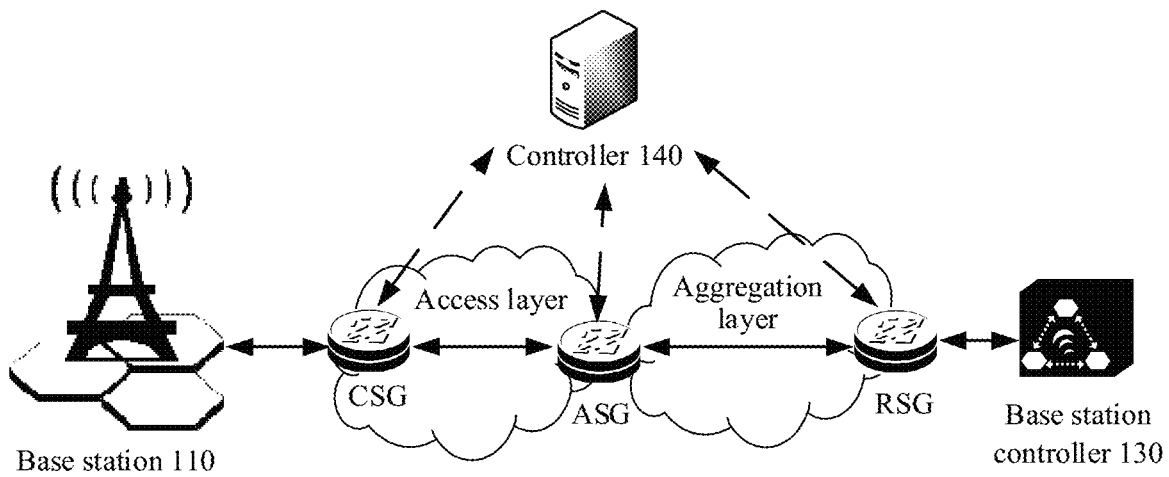
FIG. 2 is a schematic diagram of another communications system applicable to this application.

FIG. 2 is a schematic diagram of another communications system applicable to this application.

In addition to a base station 110 and a base station controller 130, the communications system may further include a controller 140. The controller 140 is configured to monitor a running status of an entire IPRAN 120. When the IPRAN 120 is faulty, the controller 140 controls a forwarding device in the IPRAN 120 to perform corresponding processing to rectify a fault. The controller 140 may be a server, a virtual machine, or a control device of another type. In the following description, a controller refers to a device that is different from a base station controller.

It should be noted that FIG. 1 and FIG. 2 are merely two examples of the communications system applicable to this application, and the communications system applicable to this application may further include another type of communications device.

When a fault occurs in the IPRAN 120, a fault point needs to be quickly located, that is, a network fault location needs to be determined, to rectify the fault in a timely manner. The following describes, by using the communications system shown in FIG. 2 as an example, a network fault locating method provided in this application.

Figure 3:
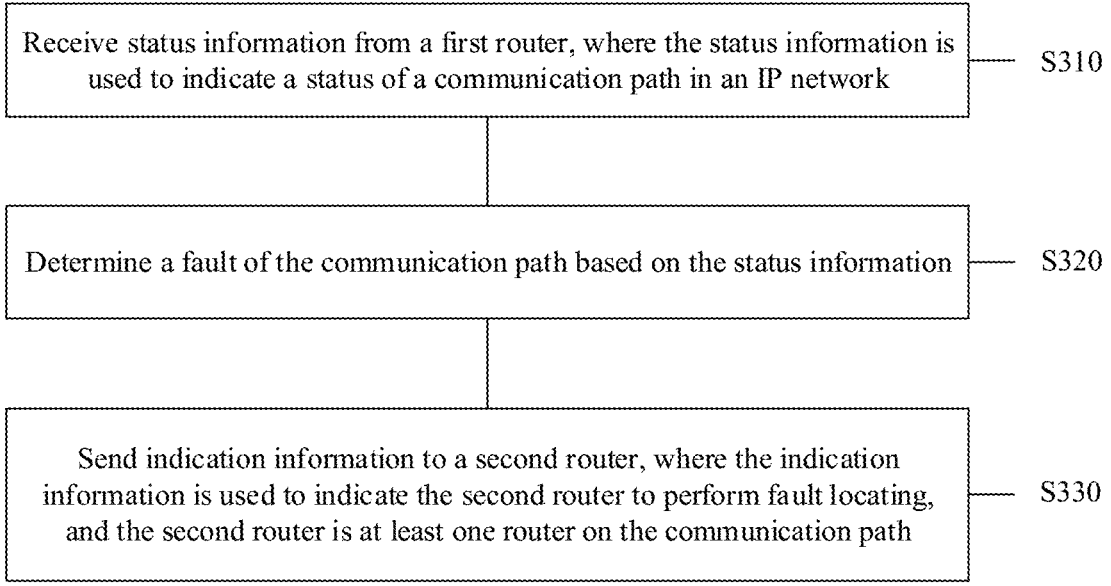
FIG. 3 is a schematic diagram of a network fault locating method according to this application.

FIG. 3 is a schematic diagram of a network fault locating method according to this application. The method 300 may be performed by a controller 140 or a chip in the controller 140. For brevity, no reference numeral is attached to the following controller, IPRAN, base station, and base station controller. The method 300 includes the following steps.

S310. Receive status information from a first router, where the status information is used to indicate a status of a communication path in an IP network.

The first router is any one or more routers in an IPRAN. For example, the first router is a CSG.

The first router may be a router with a link status monitoring function, or may be a router with no link status monitoring function. When the first router has the link status monitoring function, the first router may directly report the status information obtained by monitoring a link status to a controller. When the first router has no link status monitoring function, the first router may obtain the status information from another router (that is, a router with a link status monitoring function), and then report the status information to the controller.

The status information is used to indicate a status of the communication path (that is, a link). In other words, the status information can reflect service quality of the communication path.

For example, the IP network is an IPRAN. The first router may determine the service quality of the communication path based on received stream control transmission protocol (SCTP) data and general packet radio service tunneling protocol (GTP) data.

The service quality is, for example, one or more of an SCTP association retransmission rate, an SCTP association interruption event, a GTP tunnel packet loss rate, a forwarding latency of SCTP data and GTP data, and a GTP tunnel transmission rate.

After receiving the status information, the controller may determine whether the communication path is faulty. For example, the controller may perform the following steps.

S320. Determine a fault of the communication path based on the status information.

The following describes, by using examples, a method for monitoring a link by the first router and a method for determining a link fault by the controller.

An SCTP association retransmission event is as follows:

When a packet loss occurs in the IPRAN, retransmission is performed through an SCTP association. The SCTP association may be interpreted as a base station and a base station controller that have an association relationship. For example, an eNB and an MME are one SCTP association, and a BTS and a BSC are another SCTP association.

For example, the base station may request retransmission by using a number of gap (number of gap) field and a number of duplicate (number of duplicate) field in a selective acknowledgement (SACK) SACK (ChunkType=3) packet. ChunkType is a field in an SCTP packet header, and is used to represent different packet types. For example, when a value of ChunkType is 3, it indicates that the SCTP packet is a SACK packet. When the communication path is normal, a value of the number of gap field and a value of the number of duplicate field are both 0. If the values of the two fields each are not 0, it indicates that the base station or the base station controller initiates a retransmission request. If data that passes through the first router includes the foregoing two fields whose values each are not 0, the first router determines that one SCTP association retransmission currently occurs. The first router may directly forward the SACK packet to the controller, so that the controller determines the fault of the communication path based on the SACK packet. Alternatively, the first router may send status information including a communication path identifier and an SCTP association retransmission event identifier to the controller, to directly notify the controller of the faulty communication path and a fault type. The communication path identifier is, for example, a base station identifier.

The foregoing example is merely an example for description. The first router may alternatively monitor other information that can indicate the SCTP association retransmission event, to determine whether the SCTP association retransmission event occurs.

An SCTP association interruption event is as follows:

When the communication path between the base station and the base station controller is interrupted, or when the base station or the base station controller is faulty, the base station may be disconnected, that is, the SCTP association interruption event may be caused.

After the SCTP association interruption event occurs, the base station or the base station controller may send a shutdown (shutdown) (ChunkType=7) packet or an abort (abort) (ChunkType=6) packet to release an SCTP association. The first router may identify the SCTP association interruption event by monitoring the foregoing two types of packets.

The first router may directly forward the shutdown packet and/or the abort packet to the controller, so that the controller determines the fault of the communication path based on the shutdown packet and/or the abort packet. Alternatively, the first router may send status information including a communication path identifier and an SCTP association interruption event identifier to the controller, to directly notify the controller of the faulty communication path and a fault type. The communication path identifier is, for example, a base station identifier.

The foregoing example is merely an example for description. The first router may alternatively monitor other information that can indicate the SCTP association interruption event, to determine whether the SCTP association interruption event occurs.

A GTP tunnel packet loss event is as follows:

Data between the base station and the base station controller may be transmitted through a GTPv1-U tunnel.

The base station and the base station controller each may periodically send a GTP heartbeat packet. The base station and the base station controller each may identify the heartbeat packet by using a message type (message type) field in a GTP packet header.

When forwarding a packet, the first router may identify a GTP packet by using a user datagram protocol (UDP) port number, and identify the heartbeat packet by using the message type field in the GTP packet header.

For example, if the UDP port number in the packet received by the first router is 2152, the first router may determine that the packet is a GTP packet. In addition, the first router may determine, based on a fact that a message type field of the GTP packet is "Echo request (0x01)", that the GTP packet is a heartbeat packet.

After determining the GTP heartbeat packet, the first router may trigger counting, to count a quantity of packets that pass through the first router on the GTPv1-U tunnel, and report a counting result to the controller.

The controller may determine, based on counting results reported by different routers, whether the GTP tunnel packet loss event occurs. Table 1 and Table 2 show counting results received by the controller from two routers.

TABLE 1

Source: 100.70.183.3
Destination: 100.70.183.75

| Time | Count |
|---|---|
| 9:35:05 | 1159 |
| 9:35:15 | 1135 |
| 9:35:25 | 1345 |
| 9:35:35 | 1541 |
| 9:35:45 | 1512 |
| 9:35:55 | 1672 |

TABLE 2

Source: 100.70.183.3
Destination: 100.70.183.75

| Time | Count |
|---|---|
| 9:35:05 | 1159 |
| 9:35:15 | 1135 |
| 9:35:25 | 1345 |
| 9:35:35 | 1541 |
| 9:35:45 | 1511 |
| 9:35:55 | 1672 |

Table 1 is the counting result reported by the first router, and Table 2 is a counting result reported by a third router. "Source" and "destination" in Table 1 are the same as those in Table 2, and this indicates that the first router and the third router are located on a same communication path. The base station (IP address: 100.70.183.3) sends a GTP heartbeat packet to the base station controller (IP address: 100.70.183.75) every 10 seconds, and the first router and the third router each count a quantity of GTP packets every 10 seconds based on the GTP heartbeat packet. The first router and the third router each may report a counting result every 10 seconds, or may report counting results in a plurality of counting cycles at a time.

It can be learned from Table 1 and Table 2 that a quantity of GTP packets corresponding to a moment 9:35:45 changes (as shown by boldface), and this indicates that the GTP tunnel packet loss event occurs on a node between the first router and the third router. Therefore, the controller may determine the GTP tunnel packet loss event based on the counting results reported by the routers.

It should be noted that, to reduce complexity of the IPRAN, generally, not all routers have a link monitoring function and a status information reporting function. Another forwarding device may further exist between the first router and the third router. Therefore, that a packet loss event occurs on a communication path between the first router and the third router cannot indicate that the first router or the third router is faulty.

A transmission rate event on a GTP tunnel is as follows:

When reporting status information to the controller, a router may use the status information to carry a packet timestamp. The packet timestamp is used to indicate a moment at which a packet passes through the router. The controller may determine a transmission rate of the GTP tunnel based on timestamps at which a same packet passes through different routers.

For example, after receiving a GTP heartbeat packet, the first router reports a first timestamp, where the first timestamp is used to indicate a moment at which the GTP heartbeat packet arrives at the first router. After receiving the GTP heartbeat packet, the third router reports a second timestamp, where the second timestamp is used to indicate a moment at which the GTP heartbeat packet arrives at the third router. After receiving the first timestamp and the second timestamp, the controller may determine a transmission time of the GTP heartbeat packet between the first router and the third router based on the first timestamp and the second timestamp, and determine a transmission rate of a GTP tunnel between the first router and the third router based on the transmission time. If the transmission rate is relatively low, it indicates that a problem of a high forwarding latency may exist on a communication path between the first router and the third router.

The foregoing example is merely an example for description. The first router may alternatively monitor other information that can indicate the transmission rate of the GTP tunnel, and report the transmission rate of the GTP tunnel.

The first router may monitor one or more communication path statuses. The first router may determine, based on preset information (for example, information configured at delivery), which communication path statuses are to be monitored; or may receive configuration information from the controller, and determine, based on content of the configuration information, which communication path statuses are to be monitored.

For example, if the controller needs to monitor the GTP tunnel packet loss rate of the IPRAN, the controller may send, to the first router, configuration information that is used to indicate to monitor the GTP tunnel packet loss rate. If the controller needs to monitor the GTP tunnel packet loss rate and the GTP tunnel transmission rate of the IPRAN, the controller may send, to the first router, configuration information that is used to indicate to monitor the GTP tunnel packet loss rate and the GTP tunnel transmission rate. If some statuses of the IPRAN do not need to be monitored, the controller may indicate, by using the configuration information, the router to monitor only a status that needs to be monitored, so that load of the router can be reduced.

After determining the fault in the IPRAN, the controller may perform the following step to rectify the fault.

S330. Send indication information to a second router, where the indication information is used to indicate the second router to perform fault locating, and the second router is at least one router on the communication path.

The second router may be the first router and/or the third router described above, or may be another router on the communication path on which the fault occurs. The indication information may indicate the second router to start fault locating, to determine a fault location.

For example, the controller may indicate, by using the indication information, the second router to enable an in-band OAM (iOAM) function, that is, add iOAM information to a packet forwarded by the second router. Each time the packet including the iOAM information passes through a router, the router needs to perform corresponding processing based on the iOAM information, and report a processing result to the controller, so that the controller determines which part of the communication path is faulty.

Figure 4:
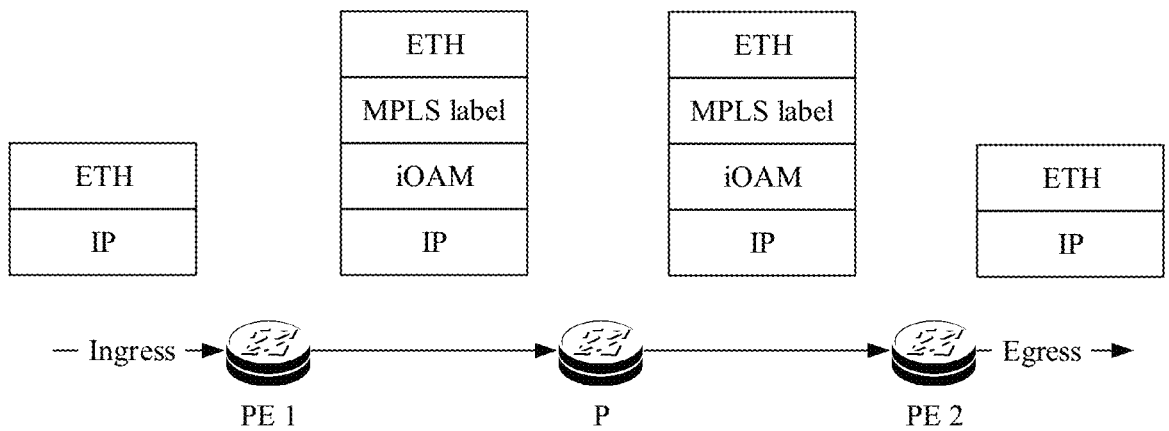
FIG. 4 is a schematic diagram of an iOAM packet encapsulation method according to this application.

FIG. 4 is a schematic diagram of an iOAM packet encapsulation method according to this application.

If a controller determines that a communication path on which three forwarding devices in FIG. 4 are located is faulty, the controller may send indication information to an edge forwarding device on the communication path, to indicate the edge forwarding device to start fault locating. All the three forwarding devices in FIG. 4 may be routers.

After receiving the indication information sent by the controller, a service provider edge (PE) device 1 adds iOAM information to an IP packet received from a user network interface (UNI). The PE 1 may add the iOAM information between an IP layer and an Ethernet layer of the IP packet, add a next-hop multi-protocol label switching (MPLS) label, and then forward the IP packet to a next-hop node, namely, a service provider (P) device. The PE device 1 further needs to report information to the controller based on the iOAM information. In FIG. 4, PE 1, PE 2, and P are respectively short for the PE device 1, a PE device 2, and the P device.

The iOAM information added to the IP packet includes a sequence number (sequence number) of each IP packet. A router parses the iOAM information of each IP packet, and then reports the sequence number to the controller. A timestamp at which the IP packet arrives at the router is also reported to the controller. The controller may determine, based on whether sequence numbers of packets are consecutive, whether a packet loss exists. A forwarding latency may also be calculated based on timestamps reported by two adjacent routers.

After receiving the packet including the iOAM information, the P device first parses the packet, determines, based on an IP address or a MAC address, that the packet is a packet that needs to be processed by the local node, then deletes the MPLS label, adds a next-hop MPLS label, and forwards the packet. In the foregoing process, after parsing out the iOAM information, the P device needs to perform corresponding processing based on content of the iOAM information, and report a processing result to the controller.

A processing manner used after the PE device 2 receives the packet including the iOAM information is similar to that of the P device. A difference lies in that the PE device 2 is located at an egress location, and when forwarding the packet including the iOAM information, the PE device 2 needs to delete the iOAM information before forwarding the packet. If a next hop is a destination address, the PE device 2 further needs to delete the MPLS label before forwarding the packet.

It should be noted that, a reason why names of the P device and the PE device are different is that the P device and the PE device are located at different locations. When the P device obtains a to-be-transmitted Ethernet packet through a UNI, the P device becomes a PE device. Correspondingly, when the PE device is used as an intermediate node, the PE device becomes a P device.

The foregoing fault locating method is merely an example for description. The router in the IPRAN may alternatively determine a fault location by using another fault locating method in the prior art.

In an optional example, the controller may send the indication information to the second router based on a type of the fault, and a correspondence exists between the type of the fault and a fault locating manner.

For example, when the type of the fault is a GTP tunnel packet loss event, to accurately determine a packet loss rate, the controller may indicate, by using the indication information, the second router to add iOAM information to each IP packet. In this way, a fault location can be accurately located even if the packet loss rate is relatively low.

For another example, when the type of the fault is an SCTP association interruption event, the controller may indicate, by using the indication information, the second router to add iOAM information to one or a few IP packets. In this way, load of the router and information overheads required for locating the network fault can be reduced while the fault is located.

In another optional example, the second router is a router adjacent to a router on which a packet loss occurs, and the second router is a router on which no packet loss occurs.

As shown in the foregoing Table 1 and Table 2, a packet loss event occurs on the communication path between the first router and the third router, but no packet loss event occurs between the first router and a previous-hop forwarding device of the first router. In this case, the controller may determine that the third router is a router on which a packet loss occurs, and the first router is the 1st normal upstream router of the router on which the packet loss occurs. The controller may send the indication information to the first router, to indicate the first router to add iOAM information to a packet, without indicating the previous-hop forwarding device of the first router to add iOAM information to the packet, thereby reducing information overheads required for locating the network fault.

The foregoing mainly describes, from a perspective of the controller, the network fault locating method provided in this application. There is a correspondence between a processing process of the router and a processing process of the controller. For example, that the router receives information from the controller means that the controller sends the information, and that the router sends information to the controller means that the controller receives the information from the router. Therefore, even if the processing process of the router is not clearly described in a part in the foregoing description, persons skilled in the art can still clearly understand the processing process of the router based on the processing process of the controller.

It may be understood that, to implement the foregoing functions, the communications apparatus includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the communications apparatus may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, division into the units in this application is an example, and is merely logical function division. During actual implementation, another division manner may be used.

Figure 5:
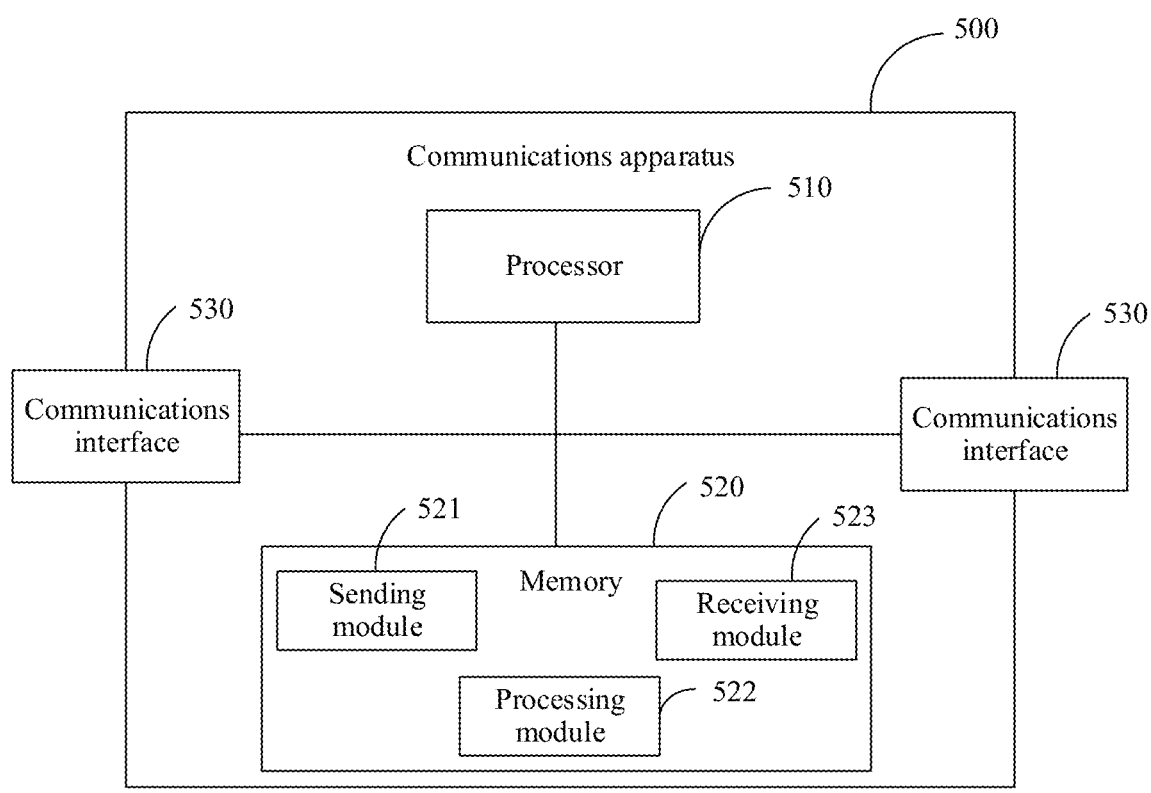
FIG. 5 is a schematic diagram of a network fault locating apparatus according to this application.

FIG. 5 is a schematic diagram of a communications apparatus according to this application.

The communications apparatus 500 may be used in the network architecture shown in FIG. 1 or FIG. 2, for example, may be used in the controller or the forwarding device in the network architecture shown in FIG. 2. The communications apparatus 500 may include a processor 510, a memory 520 coupled to the processor 510, and a communications interface 530. The processor 510 may be a central processing unit (CPU), a network processor (NP), or a combination of a CPU and an NP. The processor may further include another hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or a combination thereof. The processor 510 may be one processor, or may include a plurality of processors. The memory 520 may include a volatile memory (volatile memory), for example, a random access memory (RAM). The memory 520 may alternatively include a non-volatile memory (non-volatile memory), for example, a read-only memory (ROM), a flash (flash) memory, a hard disk drive (HDD), or a solid-state drive (SSD). The memory 520 may alternatively include a combination of the foregoing types of memories. The memory 520 may be one memory, or may include a plurality of memories. The memory 520 stores a computer-readable instruction, and the computer-readable instruction may include a plurality of software modules, for example, a sending module 521, a processing module 522, and a receiving module 523. After running the foregoing software modules, the processor 510 may perform a corresponding operation according to an indication of each software module. In this embodiment, an operation performed by a software module is actually an operation performed by the processor 510 according to an indication of the software module.

For example, when the communications apparatus 500 is a controller, after running the receiving module 523, the processor 510 is configured to:

receive status information from a first router, where the status information is used to indicate a status of a communication path in an IP network.

After running the processing module 522, the processor 510 may be further configured to determine a fault of the communication path based on the status information.

After running the sending module 521, the processor 510 may be further configured to send indication information to a second router, where the indication information is used to indicate the second router to perform fault locating, and the second router is at least one router on the communication path.

For another example, when the communications apparatus 500 is a first router, after running the receiving module 523, the processor 510 is configured to:

receive IP data.

After running the processing module 522, the processor 510 may be further configured to determine status information based on the IP data, where the status information is used to indicate a status of a communication path corresponding to the IP data.

After running the sending module 521, the processor 510 may be further configured to send the status information to a controller.

For still another example, when the communications apparatus 500 is a second router, after running the receiving module 523, the processor 510 is configured to receive indication information from a controller.

After running the processing module 522, the processor 510 may be further configured to perform fault locating on a communication path in an IP network according to the indication information.

The apparatus embodiment completely corresponds to the method embodiment. The steps in the method embodiment are performed by corresponding modules in the apparatus embodiment. For example, the communications interface performs the receiving step and the sending step in the method embodiment, and other steps than the sending and receiving steps may be performed by the processor. For a function of a specific module, refer to the corresponding method embodiment. Details are not described again.

In the embodiments of this application, sequence numbers of the processes do not mean an execution sequence. The execution sequence of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement, or improvement made based on technical solutions of this application shall fall within the protection scope of this application.

What is claimed is:

1. A network fault locating method, comprising:
receiving status information from a first router, wherein the status information indicates a status of a communication path in an internet protocol (IP) network;

determining a fault of the communication path based on the status information; and sending indication information to a second router, wherein the indication information indicates the second router to perform fault location, and the second router is at least one router on the communication path.

2. The method according to claim 1, wherein the sending indication information to a second router comprises:

sending the indication information to the second router based on a type of the fault, wherein the indication information indicates a fault locating manner.

3. The method according to claim 2, wherein the type of the fault is a packet loss, and the fault locating manner is adding in-band operation, administration and maintenance (iOAM) information to each IP packet.

4. The method according to claim 3, wherein the second router is a router adjacent to a router on which a packet loss occurs, and the second router is a router on which no packet loss occurs.

5. The method according to claim 2, wherein the type of the fault is a communication path interruption or a high forwarding latency, and the fault locating manner is adding iOAM information to one or more IP packets.

6. A network fault locating method, comprising:

receiving internet protocol (IP) data, wherein the IP data indicates radio service transmission quality of a base station;

determining status information based on the IP data, wherein the status information indicates a status of a communication path corresponding to the IP data;

sending the status information to a controller;

receiving indication information from the controller; and performing fault location according to the indication information.

7. The method according to claim 6, wherein the method further comprises:

receiving configuration information from the controller, and in response reporting the status information in accordance with the configuration information.

8. A network fault locating method, comprising:

receiving indication information from a controller; and performing fault location on a communication path in an internet protocol (IP) network according to the indication information.

9. The method according to claim 8, wherein before the receiving indication information from a controller, the method further comprises:

receiving IP data transmitted on the communication path;

determining status information based on the IP data, wherein the status information indicates a status of the communication path; and sending the status information to the controller.

10. A network fault locating apparatus, comprising:

at least one processor;

one or more memories coupled to the at least one processor and storing instructions for execution by the at least one processor, the instructions instruct the at least one processor to cause the apparatus to:

receive status information from a first router, wherein the status information indicates a status of a communication path in an internet protocol (IP) network;

determine a fault of the communication path based on the status information; and send indication information to a second router, wherein the indication information indicates the second router to perform fault location, and the second router is at least one router on the communication path.

11. The apparatus according to claim 10, wherein the instructions further instruct the at least one processor to cause the apparatus to:

send the indication information to the second router based on a type of the fault, wherein the indication information indicates a fault locating manner.

12. The apparatus according to claim 11, wherein the type of the fault is a packet loss, and the fault locating manner is adding in-band operation, administration and maintenance (iOAM) information to each IP packet.

13. The apparatus according to claim 12, wherein the second router is a router adjacent to a router on which a packet loss occurs, and the second router is a router on which no packet loss occurs.

14. The apparatus according to claim 11, wherein the type of the fault is a communication path interruption or a high forwarding latency, and the fault locating manner is adding iOAM information to one or more IP packets.

15. A network fault locating apparatus, comprising:

at least one processor;

one or more memories coupled to the at least one processor and storing instructions for execution by the at least one processor, the instructions instruct the at least one processor to cause the apparatus to:

receive internet protocol (IP) data, wherein the IP data indicates radio service transmission quality of a base station;

determine status information based on the IP data, wherein the status information indicates a status of a communication path corresponding to the IP data;

send the status information to a controller;

receive indication information from the controller; and perform fault location according to the indication information.

16. A network fault locating apparatus, comprising:

at least one processor;

one or more memories coupled to the at least one processor and storing instructions for execution by the at least one processor, the instructions instruct the at least one processor to cause the apparatus to:

receive indication information from a controller; and perform fault location on a communication path in an internet protocol (IP) network according to the indication information.

17. The apparatus according to claim 16, wherein the instructions further instruct the at least one processor to cause the apparatus to:

receive IP data transmitted on the communication path;

determine status information based on the IP data, wherein the status information indicates a status of the communication path; and send the status information to the controller.

* * * * *